Jan. 5, 1960

A. BOSCHI 2,919,951

WHEEL FOR RAIL VEHICLES

Filed Feb. 5, 1957

INVENTOR
*ANTONIO BOSCHI*,

BY *Stone & Mack*.

ATTORNEYS

Jan. 5, 1960 A. BOSCHI 2,919,951
WHEEL FOR RAIL VEHICLES
Filed Feb. 5, 1957 2 Sheets-Sheet 2

INVENTOR
ANTONIO BOSCHI
BY Stone + Mack
ATTORNEYS

United States Patent Office 2,919,951
Patented Jan. 5, 1960

2,919,951
WHEEL FOR RAIL VEHICLES

Antonio Boschi, Milan, Italy, assignor to Societá Applicazioni Gomma Antivibranti S.A.G.A. Societá per Azioni, Milan, Italy Application February 5, 1957, Serial No. 638,355

1 Claim. (Cl. 295—11)

This present invention pertains to disc wheels for vehicles-on-rails and more particularly has reference to wheels mounted on axles whose length is relatively limited with regard to the diameter of the wheel; as for example, wheels for railway cars having independent wheels, that is to say, where each wheel is separately mounted in a central position on its individual axle.

An object of the present invention is to provide a wheel wherein the nave and the supported disc flange are in one piece with the axle. The product is suggestive of a monolithic structure of metal. This novel type wheel presents the following advantages over prior art rail vehicle wheels having the nave and supported disc flange formed as units, separate from the axle and mounted thereon by an articulated coupling:

(a) Greater economy, owing to the elimination of all machining of both of axle and nave, correspondingly to the coupling.

(b) Higher resistance to stresses and strains due to the unitary character of the structure of the axle, nave and disc flange.

Further characteristics and advantages of my invention are set forth in the following description with reference to the annexed drawings wherein.

Figure 1:
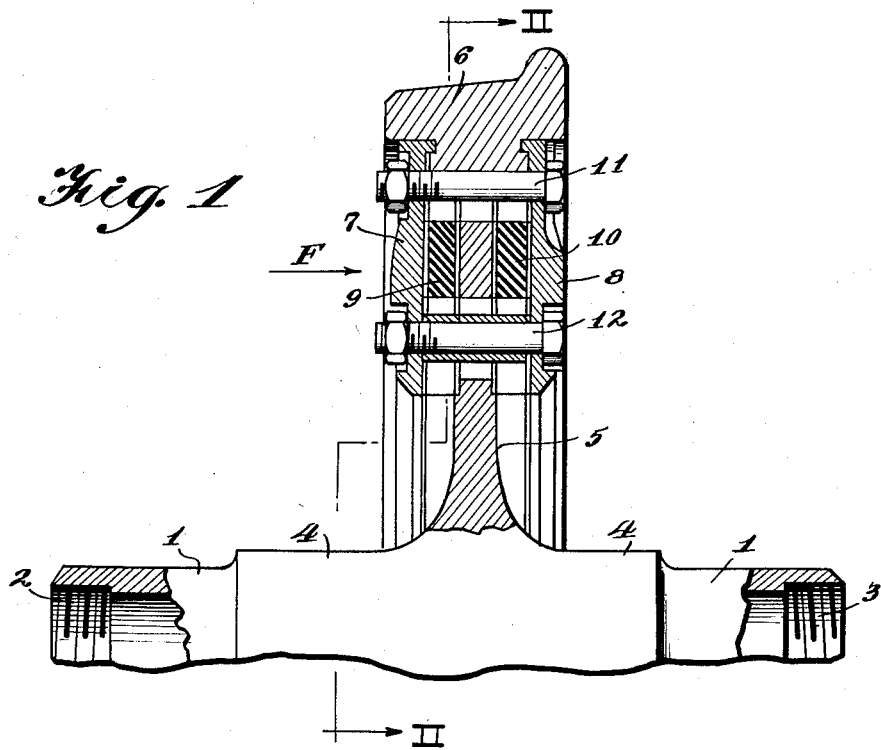
Figure 1 is a front elevation of the wheel, with a partial section along the line I—I of Figure 2.
Figure 3:
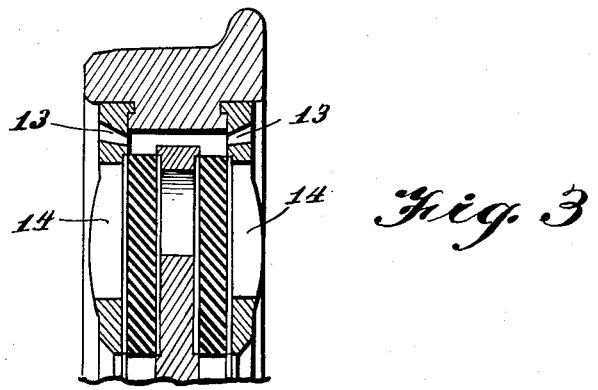
Figure 3 is a section along the line III—III of Figure 2.
Figure 2:
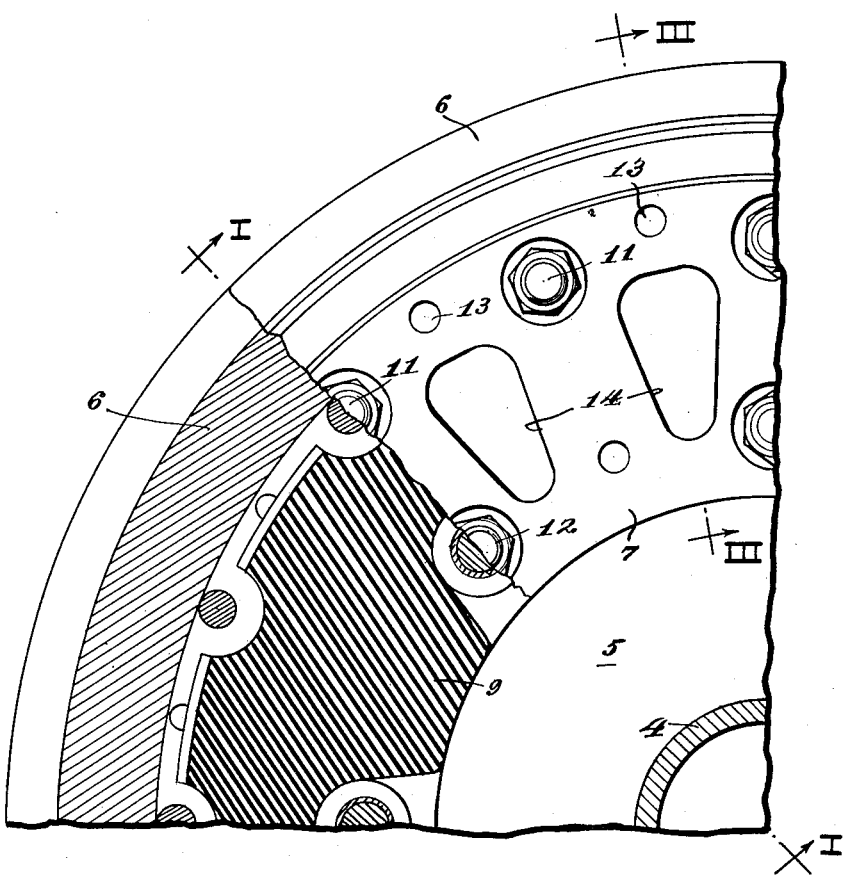
Figure 2 is a quarter side elevation of the wheel, viewed in the direction of arrow F of Figure 1, with a partial section along the line II—II of Figure 1.

The reference numeral 1 denotes a tubular axle having threaded end heads 2 and 3 adapted for fixing thereon the suspension structure of the supported vehicle.

Reference numerals 4 and 5 indicate respectively a nave and flange disc which are made in one piece with the axle 1, and are connected to the mid-portion of the axle; the nave 4 having a larger diameter than the axle 1.

A rim 6 of the wheel is mounted upon disc 5 and is connected thereto by means of cheek plates 7 and 8 and interposed resilient annular elements 9 and 10.

The cheek plates 7 and 8 are tied together and secured to rim 6 by bolts 11 and 12, and are also provided with holes 13 and 14 for ventilation of the wheel.

The above described elastic connection between the disc 5 of the wheel and the rim 6 is given only as an example, and it forms no part of the present invention.

While I have shown and described the preferred form of my invention, I desire it to be understood that I do not limit my invention to the precise details of construction and arrangement disclosed by way of illustration, as these may be changed and modified by those skilled in the art without departing from the spirit of my invention or exceeding the scope of the appended claim.

I claim:

A resilient wheel for independently and directly supporting rail vehicle comprising: a tubular axle having internally threaded end portions to which the suspension structure of the vehicle is directly attached; a tubular nave formed integrally with a major portion of said axle at a longitudinally centered part of the latter; a disc flange formed integrally with the mid-portion of said nave and extending radially therefrom; a rim circumferentially and symmetrically surrounding said flange; and means resiliently connecting said flange and rim; thereby providing a single-wheeled axle and wheel combination which directly supports said vehicle at two points symmetrically equispaced from said rim.

References Cited in the file of this patent
UNITED STATES PATENTS

| | | |
|---|---|---|
| 441,014 | Mahood | Nov. 18, 1890 |
| 498,171 | Kirk | May 23, 1893 |
| 1,133,986 | McCoy | Mar. 30, 1915 |
| 1,179,134 | Nielsen | Apr. 11, 1916 |
| 2,800,357 | Boschi | July 23, 1951 |